UNITED STATES PATENT OFFICE.

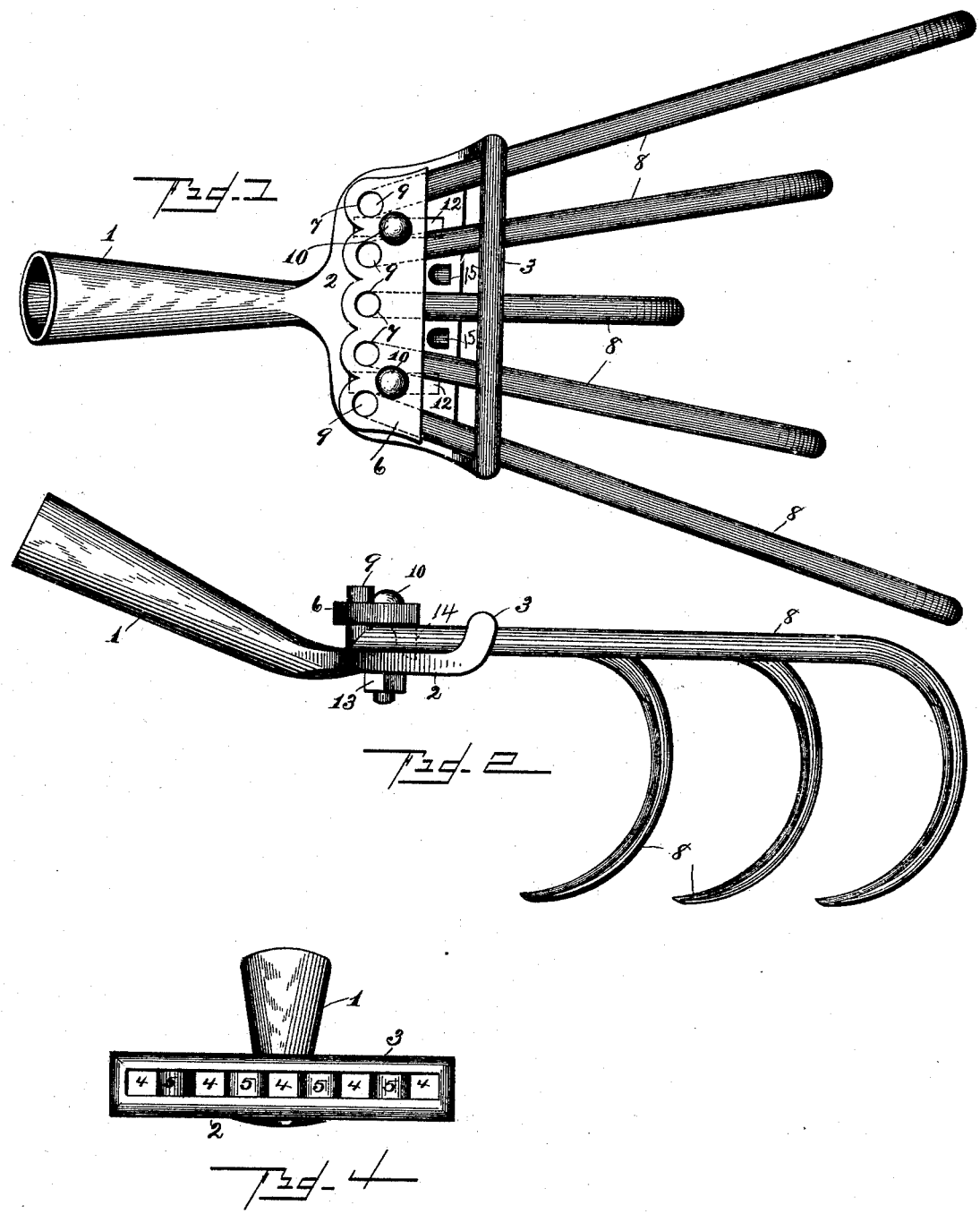

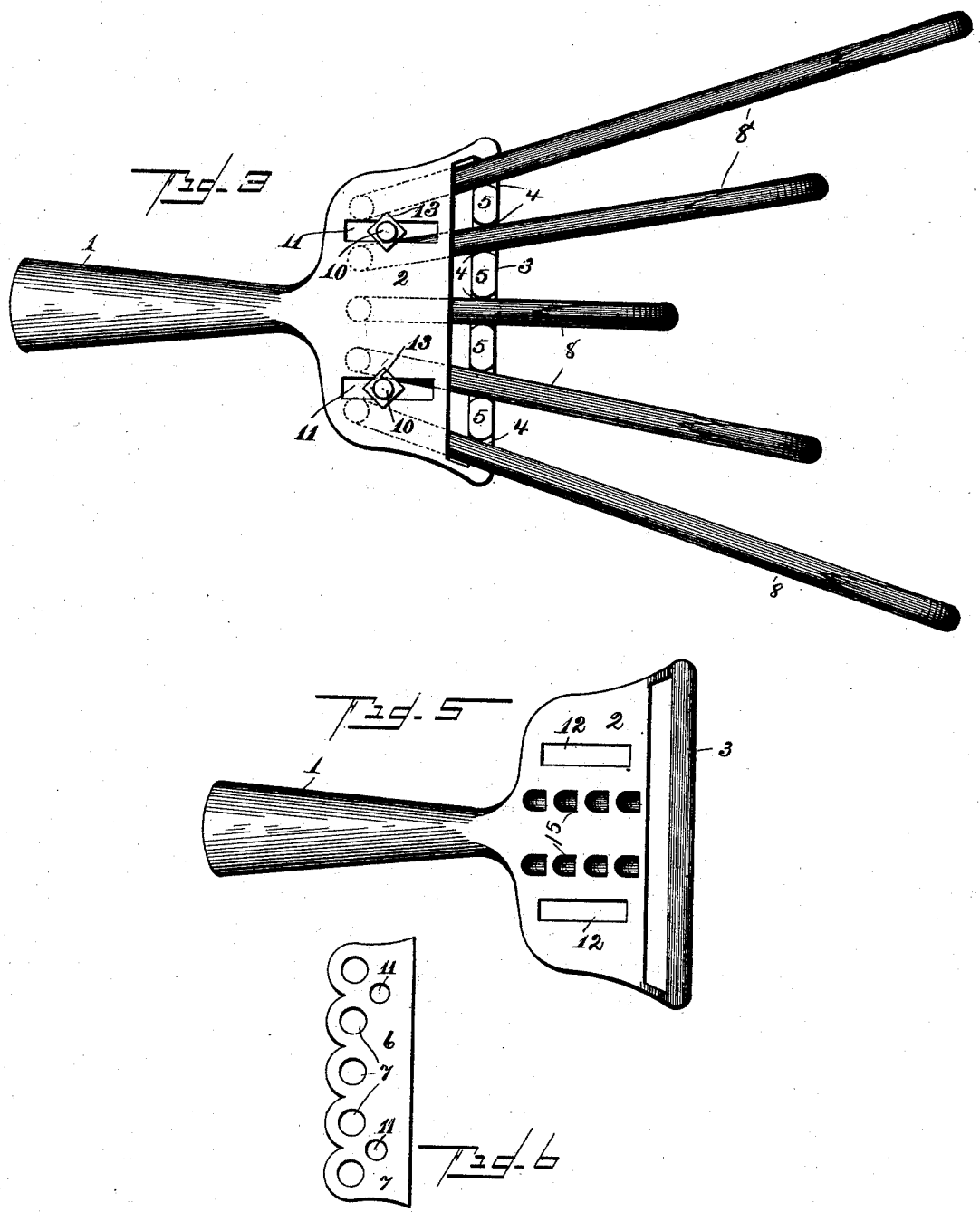

JAMES ALBERT LINN, OF LIBERTY, ILLINOIS.

GARDEN-RAKE.

SPECIFICATION forming part of Letters Patent No. 509,921, dated December 5, 1893.

Application filed April 20, 1893. Serial No. 471,110. (No model.)

*To all whom it may concern:*

Be it known that I, JAMES ALBERT LINN, of Liberty, in the county of Adams and State of Illinois, have invented certain new and useful Improvements in Garden-Rakes, of which the following is a specification, reference being had to the accompanying drawings.

The object of my invention is to produce new and simple means for adjusting the tines in that class of rakes, which is known as expansible rakes, or cultivators.

In the accompanying drawings: Figure 1, is a top plan view of my device. Fig. 2, is a side elevation thereof. Fig. 3, is a bottom plan view of the same. Fig. 4, is a front elevation of the head plate. Fig. 5, is a top plan view of the head plate; and Fig. 6, a plan view of the lug plate detached.

Referring to the figures on the drawings: 1 indicates a hollow handle socket, illustrated as convenient means of attachment to a handle. 2 indicates a head plate preferably made integral therewith.

3 indicates the front wall of the head plate, which may be formed in any suitable manner upon the front part of the head plate, as, preferably, by upturning the edge thereof.

4 indicates perforations or slots in the front wall of the head plate, separated by spacing pieces 5 of suitable width.

6 indicates a lug plate having bearing apertures 7 arranged at a suitable distance apart and separated by suitable widths or spacing pieces in the front wall of the head plate.

8 indicates tines having on their inner ends pivot lugs 9 preferably designed to be pivotally carried within respective apertures 7. It will be perceived by this arrangement the respective differences between the bearing apertures 7 and the slots 4 being different that the movement of the lug plate will move the tines and cause the outer ends of the tines to be separated by greater or less distances depending upon the distance of the lug plate from the front wall. In addition to such mechanism for adjusting the tines, I prefer to employ suitable clamp mechanism, as for example, bolts 10 passing through suitable apertures 11 in the lug plate, and through slots 12 in the head plate vertical to the front wall. Nuts 13 are adapted to secure the bolt and firmly clamp the ends of the tines between the lug plate and the head plate and fix them immovably in their desired adjustments. I also prefer to use lugs 14 engaging notches 15 in order to lend firmness to the assembled parts.

I do not desire to limit myself to the details of construction herein shown and described, but wish to reserve the right to modify and vary the same at will within the scope of my invention.

What I claim is—

1. In a rake or cultivator, the combination with a head plate and tines spacing pieces, of tine adjusting mechanism consisting of a movable plate adapted to be secured to the head plate, bearing apertures in the movable plate, separated by different distances, respectively, from the distances between the spacing pieces and tines carried therein, substantially as and for the purposes specified.

2. In a rake or cultivator, the combination with a head plate, front wall and apertures, of a lug plate, and tines pivoted therein, slots in the head plate vertical to the front wall, bolts adapted to pass through the lug plate and the slots in the head plate and nuts to adjustably secure the lug plate upon the head plate, substantially as specified.

In testimony of all which I have hereunto subscribed my name.

JAMES ALBERT LINN.

Witnesses:
H. M. WARD,
JAS. GALLIHER.